US008323835B2

(12) United States Patent
Davis et al.

(10) Patent No.: US 8,323,835 B2
(45) Date of Patent: Dec. 4, 2012

(54) BATTERIES HAVING MULTIPLE ANODE PORTIONS

(75) Inventors: Stuart M. Davis, Norfolk, MA (US); Javit A. Drake, Jamaica Plain, MA (US); Richard E. Durkot, East Walpole, MA (US); Gary A. Miller, Milton, MA (US); Thomas C. Richards, Framingham, MA (US)

(73) Assignee: The Gillette Company, Boston, MA (US)

( * ) Notice: Subject to any disclaimer, the term of this patent is extended or adjusted under 35 U.S.C. 154(b) by 1099 days.

(21) Appl. No.: 12/243,121

(22) Filed: Oct. 1, 2008

(65) Prior Publication Data

US 2010/0081046 A1    Apr. 1, 2010

(51) Int. Cl.
*H01M 2/14* (2006.01)
*H01M 6/10* (2006.01)
(52) U.S. Cl. ........ 429/246; 429/129; 429/131; 429/140; 429/94
(58) Field of Classification Search .................. 429/94, 429/129–147, 247, 246
See application file for complete search history.

(56) References Cited

U.S. PATENT DOCUMENTS

| | | | | |
|---|---|---|---|---|
| 4,154,905 A | * | 5/1979 | Urry | 429/94 |
| 4,726,779 A | * | 2/1988 | Costenoble et al. | 429/133 |
| 5,948,561 A | * | 9/1999 | Urry | 429/164 |
| 6,284,410 B1 | * | 9/2001 | Durkot et al. | 429/229 |

OTHER PUBLICATIONS

Chen et al., "Modeling of Cylindrical Alkaline Cells III. Mixed-Reaction Model for the Anode", J. Electrochem. Soc., vol. 140, No. 5, pp. 1205-1212.
Chen et al., "Modeling of Cylindrical Alkaline Cells IV. Dissolution-Precipitation Model for the Anode", J. Electrochem. Soc., vol. 140, No. 5, pp. 1213-1218.
Kordesch., "Manganese Dioxide", Batteries, vol. 1, pp. 338-341, 1974.
Newman et al., "Theoretical Analysis of Current Distribution in Porous Electrodes", Journal of the Electrochemical Society, pp. 1183-1191, Dec. 1962.

* cited by examiner

*Primary Examiner* — Tracy Dove
(74) *Attorney, Agent, or Firm* — Fish & Richardson P.C.

(57) ABSTRACT

A battery includes a housing, an anode and a cathode within the housing, the anode having a first portion and a second portion adjacent to each other, a current collector at least partially disposed in the anode, a separator between the anode and the cathode, and an anode portion separator at least partially disposed in the anode and between the first and second portions of the anode.

19 Claims, 4 Drawing Sheets

BATTERIES HAVING MULTIPLE ANODE PORTIONS

TECHNICAL FIELD

This invention relates to batteries.

BACKGROUND

Batteries are commonly used as electrical energy sources. A battery contains a negative electrode, typically called the anode, and a positive electrode, typically called the cathode. The anode contains an active material that can be oxidized. The cathode contains an active material that can be reduced. The anode active material is capable of reducing the cathode active material.

When a battery is used as an electrical energy source in a device, electrical contact is made to the anode and the cathode, allowing electrons to flow through the device and permitting the respective oxidation and reduction reactions to occur to provide electrical power. An electrolyte in contact with the anode and the cathode contains ions that flow through the separator between the electrodes to maintain charge balance throughout the battery during discharge.

Commercial primary alkaline batteries often include cathodes including manganese dioxide and anodes including zinc. Such batteries often have a cylindrical housing and come in standard AA, AAA, AAAA, C, and D sizes defined by International Electrotechnical Commission standards. Each manufactured alkaline battery contains an amount of cathode and anode active materials that is limited by the internal volume of the battery, and has a theoretical amount of electronic discharge capacity determined by the amount of the active materials. For example, an AA, AAA, AAAA, C, and D battery has a theoretical discharge capacity of about 3.7 Ah (Ampere hour), about 1.5 Ah, about 0.7 Ah, about 10.4 Ah, and about 22.9 Ah, respectively.

In use, the total amount of capacity that can be extracted from the battery during the lifetime of the battery is less than 100% of the theoretical capacity of the battery. This can be due to three kinds of losses: Ohmic losses, activation polarization losses, and concentration polarization losses of the capacity. In particular, concentration polarization losses of the battery capacity occur when the active materials are depleted or reaction products build up excessively within a local region of the battery, for example, near one or both of the electrodes. The depletion of the active materials occurs when the rate of consumption of the active materials exceeds the rate of active material replacement by means of diffusion, electro-migration, osmosis, or other mechanisms. A build-up of reaction products occurs when the rate of generation of reaction products exceeds the rate at which the generated reaction products escape from the reaction zone by diffusion, electro-migration, osmosis, or other mechanisms. When either of the active material depletion or the reaction product build-up takes place, an unfavorable shift in operating voltage for the electrodes of the battery can occur. This results in a lower battery operating voltage and the voltage of the battery can fall below the operating voltage of a device before the battery is fully discharged.

Ohmic losses can be due to either electronic or ionic resistances in the battery. In particular, ionic losses from ionic resistances can occur based on the physical state of the electrolyte, for example, the electrolyte can be free or can be absorbed in a matrix of solids, such as the pores of the anode, cathode, or separator. The ionic resistance is the lowest when a maximum ionic conductivity of the electrolyte is reached when the electrolyte is substantially in the form of pure liquid electrolyte. When the electrolyte coexists with solid phase materials, the ionic resistance can increase based on the limitation of the ionic conduction paths in the electrolyte to channels in the solid matrix that are filled with electrolyte. These channels follow paths through the inter-connected pores and can be long and tortuous. The cross sectional area available for ionic conduction in the electrolyte phase can also be limited by the small pore diameters along the paths. A high ionic resistance can give rise to significant Ohmic losses as the battery is discharged. The ionic resistances can exist in a fresh, as-manufactured battery, due to the existing pore structures of the anode, cathode, and separator and can change during the use of the battery

SUMMARY

In one aspect, the invention features a battery that includes a housing, an anode and a cathode within the housing, the anode having a first portion and a second portion adjacent to each other, a current collector at least partially disposed in the anode, a separator between the anode and the cathode, and an anode portion separator at least partially disposed in the anode and between the first and second portions of the anode.

Implementations may include one or more of the following features. The anode portion separator can be cylindrical. The separator between the anode and the cathode and the anode portion separator can be concentric. The current collector can be at least partially disposed in the first portion and the separator between the cathode and the anode can be between the second portion of the anode and the cathode. The separators can be formed of separate pieces of material. The separators can be formed of an integral piece. The current collector can be electrically disconnected from the second portion of the anode prior to discharge. The separators can be electrically insulating and can be permeable to materials selected from the group consisting of dissolved substances, liquids, solvents, and ions. The separators can be cylindrical and the anode portion separator can have a diameter of about 10% to about 85% of a diameter of the separator between the anode and the cathode. The battery can be a AA battery and the anode portion separator can be cylindrical and can have a diameter of about 3/16 inch to about 7/32 inch. The anode portion separator can have a thickness of about 40 µm to about 400 µm. The anode can include zinc particles and the zinc particles in the first portion can have an average size substantially larger or smaller than an average size of the zinc particles in the second portion. The second portion of the anode can include zinc particles having an average size of about 20 µm to about 100 µm. The first portion of the anode can include zinc particles having an average size of about 100 µm to about 500 µm. The current collector can extend along a longitudinal axis of the battery and can be about 2/3 to about 3/4 of a total length of the battery. The first and second portions of the anode each can include about 50 wt % to about 90 wt % of zinc. The second portion of the anode can start discharging after the first portion. The first and second portions can be electrically disconnected prior to discharge of the battery and an electrical connection can be formed between the first and second portions of the anode after the first portion has started to discharge.

In another aspect, the invention features a method of making a battery. The method includes filling into a space bounded by a separator an anode material, inserting into the space an anode portion separator to partition the space into a first space and a second space, the anode material being contained in the second space, and filling into the first space another anode material.

Implementations may include one or more of the following features. The anode portion separator can be inserted concentrically with the separator. The anode portion separator can be inserted non-concentrically with the separator. The anode separator can be tubular and can include a sealed end. The anode materials can be the same. The anode materials can be different. The anode portion separator can be made by first winding a separator material about a rod and then bending the innermost winding of the separator material to form a partition that divides the space into the first and second spaces.

In another aspect, the invention features a battery that includes a housing, an anode within the housing, the anode comprising a first portion and a second portion electrically disconnected from the first portion prior to discharge of the battery, the first portion starting discharging before the second portion when the battery is in use, a cathode within the housing, and a separator between the cathode and the anode.

Implementations may include one or more of the following features. The battery can also include an anode portion separator between the first and second portions of the anode. The first and second portions of the anode can be electrically connected through an electrical connection formed after the first portion starts discharging.

Primary alkaline batteries are meant to be discharged, e.g., to exhaustion, only once, and then discarded. Primary cells are not intended to be recharged. Primary batteries are described, for example, in David Linden, Handbook of Batteries (McGraw-Hill, 3d ed. 2001).

All publications, patent applications, patents, and other references mentioned herein are incorporated by reference herein in their entirety.

Other features and advantages of the invention will be apparent from the following detailed description, and from the claims.

DESCRIPTION OF DRAWINGS

Like reference symbols in the various drawings indicate like elements.

DETAILED DESCRIPTION

Figure 1:
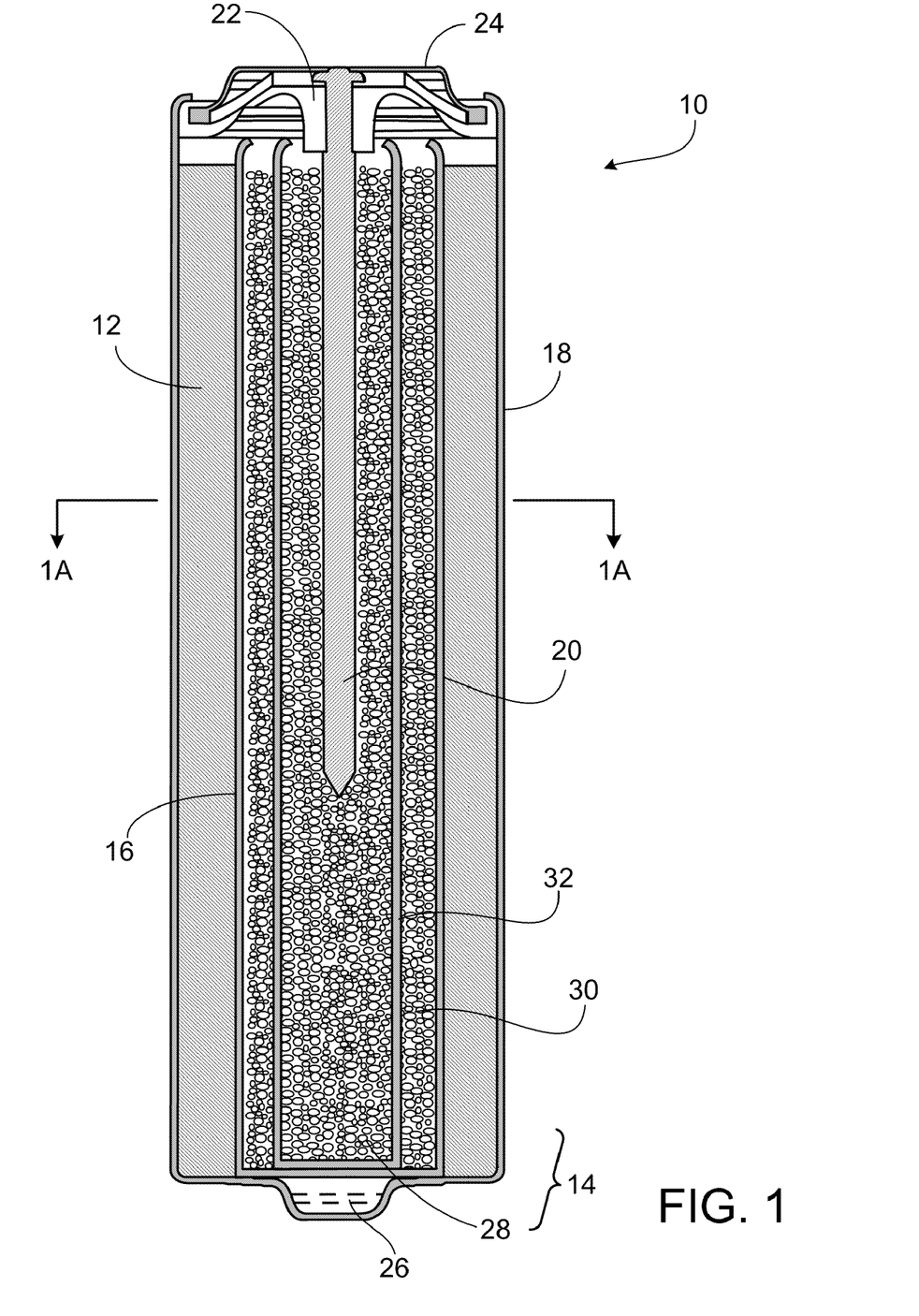
FIG. 1 is a schematic axial cross-sectional view of a battery.

Referring to FIG. 1 a primary alkaline battery 10 includes a housing 18 containing a cathode 12 contacting housing 18, an anode 14, and a separator 16 between cathode 12 and anode 14. Anode 14 includes an inner portion 28 in communication, e.g., electrical communication, with a current collector 20 and an outer portion 30 adjacent to the cathode and electrically disconnected (partially or completely) from the inner portion 28 and current collector 20 by a separator 32.

Cathode 12 includes one or more cathode active materials and anode 14 contains one or more anode active materials. Battery 10 also includes a seal 22 and a negative metal end cap 24, which serves as the negative terminal for the battery. A positive pip 26, which serves as the positive terminal of the battery, is at the opposite end of the battery from the negative terminal. An electrolytic solution is dispersed throughout battery 10. Housing 18, cathode 12, separator 16, and anode 14 each can be cylindrical. Battery 10 can be, for example, an AA, AAA, AAAA, C, or D battery.

When battery 10 is in use, an external load (not shown) is connected to the positive and negative terminals. The electrons generated within anode 14 by chemical reactions between the anode materials and the electrolyte solution are collected by current collector 20 and directed through the external load back to the cathode of battery 10, where the cathode materials and the electrolyte react.

Figure 1A:
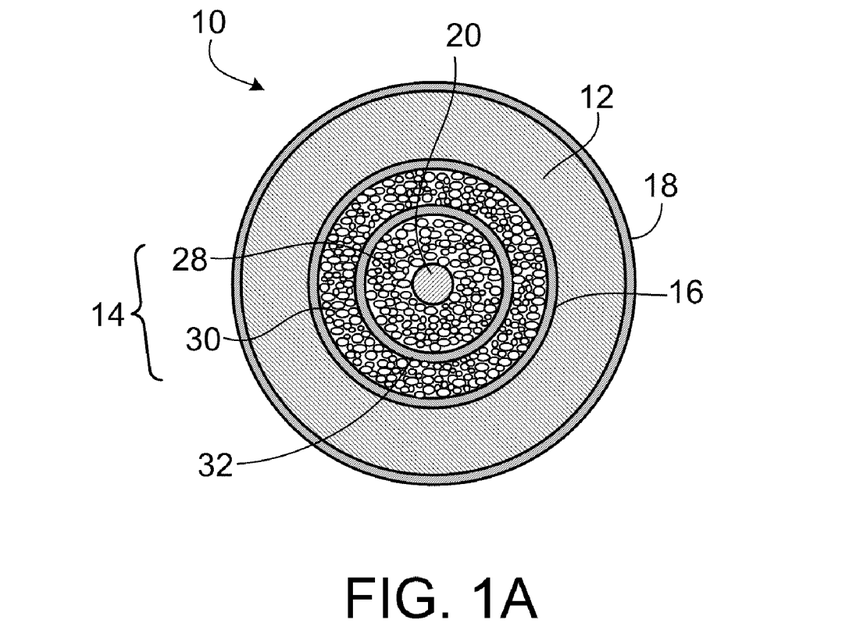
FIGS. 1A and 1B are schematic cross-sectional views of a battery.

Referring to FIG. 1A, separator 32 electrically separates current collector 20 and the outer portion 30 of anode 14 prior to the use of battery 10. Separator 32 can be cylindrical with a circular cross-section. Separators 32 and 16 can be disconnected from each other and concentrically arranged. The diameter of separator 32 can range between about 10% to about 85%, for example, 50%, of the diameter of separator 16. For example, when battery 10 is an AA battery, separator 32 has a diameter of about 2.5 mm to about 7.4 mm and separator 16 has a diameter of about 8.82 mm. When battery 10 is an AAA battery, separator 32 has a diameter of about 2.0 mm to about 5.5 mm and separator 16 has a diameter of about 6.5 mm. The inner portion 28 contains about 10% to about 70% of the total anode active materials and the outer portion 30 contains about 90% to about 30% of the total anode active materials. Separator 32 can also have other cross-sectional shapes (not shown), for example, triangular, square, or other regular or irregular geometric shapes. Separators 16 and 32 can be non-concentric relative to each other.

Figure 1B:
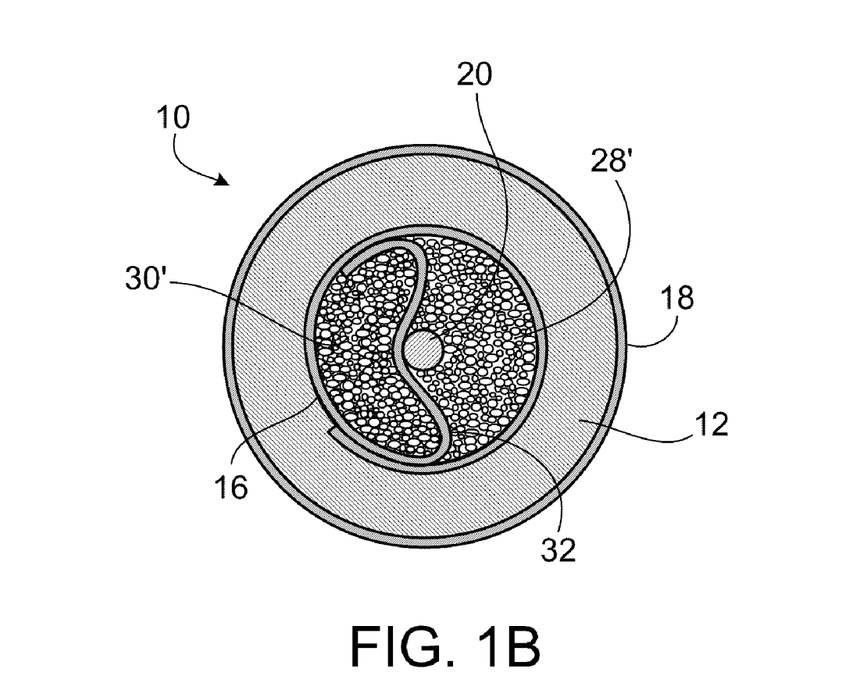

Referring to FIG. 1B, separators 16 and 32 can be formed of an integral piece that continuously winds between anode 14 and cathode 12 and further extends into anode 14 to divide anode 14 into portions. Instead of being separated into the inner portion 28 and outer portion 30 as described in FIGS. 1 and 1A, anode 14 forms a side portion 28' that is in electrical contact with collector 20 and a side portion 30' that is electrically disconnected from collector 20. The amount of anode active materials contained in different side portions can be adjusted by changing, for example, the shape and location of separator 32.

Separator 32 can also be in a form other than those described in FIGS. 1 and 1A-1B. In some embodiments, separator 32 can be in a form that partitions anode 42 into more than two electrically disconnected portions. For example, separator 32 can include two or more connected or disconnected pieces that geometrically and electrically divide anode 14 into different portions, one of which is in electrical connection with current collector 20.

Separator 32 can have a thickness of about 40 μm to about 400 μm. For example, separator 32 can be made of a single thick layer of material or multiple winds of a thin material.

Separator 32 can include conventional alkaline battery separator materials. In some embodiments, separator 32 can include a layer of cellophane combined with a layer of non-woven material. Separator 32 also can include an additional layer of non-woven material. In some embodiments, separator 32 can be different from a conventional alkaline battery separator. The pores of separator 32 can have diameters ranging between about 5 μm to about 25 μm and a density of about 200-1000 pores/mm$^2$. Separator 32 provides an initial electrical separation between the outer portion 30 of anode 14 and current collector 20 and allows a subsequent formation of electrical connection between the outer portion 30 and inner portion 28 (therefore current collector 20) through the pores. Separator 32 provides an ionic conduction path between outer portion 32 and inner portion 28 of the anode so that the two anode portions 28 and 30 are in ionic communication with each other. Electrolyte solution, ions, and solvent can also pass through separator 32.

Separator 32 can facilitate the discharge of partitioned anode 14 in a spatially controlled manner so that anode 14 discharges more uniformly and more thoroughly over the entire discharge lifetime compared to a conventional battery with a single, non-partitioned anode. Therefore battery 10 can have a high percentage of its theoretical capacity extracted and the service life of battery 10 can therefore be increased.

The entire discharge lifetime of battery 10 can include an initial discharge period and a subsequent discharge period. During the initial discharge period, discharge of anode 14 is substantially limited to the inner portion 28 (or side portion 28' of FIG. 1B) of anode 14 and no substantial discharge takes place in the outer portion 30 (or side portion 30' of FIG. 1B) of anode 14. This initial discharge period produces solid anode reaction products which accumulate in localized regions of the battery. Without wishing to be bound by theory, it is believed that during the initial discharge period, in a conventional alkaline cell without separator 32, solid anode reaction products accumulate mainly in a ring adjacent to the separator separating the anode and the cathode of the battery and opposite to the cathode. These solid anode reaction products between the cathode and unreacted regions of the anode can block the transport and/or decrease the transport rate of reactants or reaction products, e.g., electrolyte, solvent (water), or ions, between the cathode and the regions of the anode. This can result in an incomplete reaction and usage of the reactants in regions of anode 14 and prematurely decrease the battery voltage. In such situations, the percentage of the battery's theoretical capacity extracted from the battery is low and the battery discharge service time will be short.

Without being bound by theory, it is also believed that it is preferable to force the anode to discharge in stages to achieve discharge uniformity over the entire battery. During the initial discharge period, the spatially controlled production and accumulation of anode reaction products occur away from separator 16 and within anode portion 28 of FIG. 1A or anode portion 28' of FIG. 1B. This avoids blocking of region 30 of FIG. 1A or region 30' of FIG. 1B from communication with cathode 12. and allows subsequent discharge of these regions. This multi-stage discharge can lead to a uniform and thorough discharge of the entire anode and a high percentage of the theoretical capacity of the battery can be extracted.

In some embodiments, the inner portion 28 of anode 14 is substantially discharged prior to the substantial discharge of the outer portion 30 and the discharge of anode 14 during the subsequent discharge period is substantially spatially limited to the outer portion 30. In some embodiments, the inner portion 28 of anode 14 continues to discharge substantially during the subsequent discharge period. Without wishing to be bound by theory, it is believed that during the initial discharge period, conductive connections are formed between the inner and outer portions of anode 14 to allow an electrical contact between the outer portion 30 of anode and current collector 20. For example, oxidation of the anode active material, e.g., zinc, in the initial discharge period produces zinc oxide, which can precipitate into the pores of separator 32. Zinc oxide often forms as a non-stoichiometric compound with semi-conductor properties. Blue, "n" type semi-conductive zinc oxide is commonly observed as a discharge product in alkaline batteries. Such semi-conductive particles of zinc oxide can form electronic connections through the separator, connecting the anode active materials of the two partitioned anode portions 28 and 30. The discharge reactions can subsequently proceed in anode portion 30, which was formerly isolated from current collector 20. In some embodiments, metallic zinc can be deposited in separator 32 to form zinc dendrites during rest periods between uses of battery 10 (e.g., when after use, battery 10 is disconnected and reconnected to another external load for use, or the external load is operated discontinuously). These metallic zinc dendrites function similarly to the semi-conductive zinc oxide particles to facilitate discharge of the anode portion 30.

The spatially separated, stepwise discharge of partitioned anode 14 produces a final, overall discharge profile that is more uniform than that obtained with a conventional, non-partitioned anode subjected to the same discharge regime. A direct observation of the discharge behavior of anode 14 can be obtained by open-cell experiments. In some embodiments, the spatial uniformity of the discharge of anode 14 can be quantitatively indicated by the ratio of an electronic resistance within anode 14 to an ionic resistance of anode 14. The electronic resistance of an anode, as used herein, is the total resistance of the electrical conducting materials contained within the anode compartment (normally including zinc particles and the metal current collector), and the accumulated contact resistance between these materials. The ionic resistance of an anode as used herein, is the total resistance of the electrolyte solution within the anode, which depends on the solution conductivity and its spatial distribution within the anode compartment. The spatial distribution of the electrolyte is determined by the presence of the solid materials (zinc metal, solid zinc oxide, or zinc hydroxide), which also occupy the anode compartment. The electronic resistance and the ionic resistance can be measured by electrochemical impedance spectroscopy. The electronic resistance and the ionic resistance each varies during the discharge of the battery, and the ratio of the electronic resistance to the ionic resistance can change accordingly. Without wishing to be bound by theory, it is believed that when the ratio of the electronic resistance to the ionic resistance averaged over the entire discharge period of a battery (average ratio) is increased, e.g. closer to unity (1), the anode discharges more uniformly. Information about the relationships between the resistance ratios and the discharge uniformity of a battery is provided in Chen et al., Electrochemical Society 140, 1213 (1993) and Newman, et al., Electrochemical Society 109, 1183 (1962). Information about measurement of resistance ratios in an alkaline battery is provided in Chen, et al., Electrochemical Society 140, 1205 (1993).

Battery 10 with partitioned anode 14 demonstrates a high ratio of the electronic resistance to the ionic resistance when averaged over the entire discharge lifetime of battery 10. During the initial discharge period, the discharge reaction occurs substantially exclusively within the anode portion 28. Substantially no reaction products are formed in the anode portion 30 and no solid barrier forms adjacent to the inner surface of separator 16. Electrolyte, water, and ions from the cathode can be transported into the anode portion 30. Soluble zinc oxide formed within the anode portion 28 can be transported outwards across separators 16 and 32 and into cathode 12. The electronic resistance of the anode portion 28 is low, when measured from current collector 20 to the zinc particles located adjacent to the inner surface of separator 32. During this same period, the electronic resistance of the anode portion 30 is nearly infinite, when measured between the current collector and the zinc particles located adjacent to the inner surface of separator 16. Hence the average electronic resistance within the entire anode 14 is high.

As more of the anode portion 28 reacts, the reaction products precipitate, and semi-conductive zinc oxide and/or metallic zinc dendrites form conduction bridges across separator 32. An electrical path between current collector 20 and the anode portion 30 is generated. The total resistance of the anode, measured between current collector 20 and the zinc particles located in the outermost shell of the anode portion 30, decreases substantially and the anode portion 30 begins to discharge. Discharge of the anode portion 28 can also continue while the outer anode portion 30 is discharging.

The discharge behavior of anode 14 and therefore of battery 10 can be adjusted, for example, by changing the properties of separator 32, such as the shape, the diameter when it has a circular cross-section, the thickness, and the material. In some embodiments, when separators 16 and 32 are concentric, battery 10 including a large diameter separator 32 demonstrates a good discharge uniformity across the entire anode.

In addition, the discharge behavior of anode 14 can also be modified by changing the properties, for example, formulation or sizes of components, of the anode active materials included in different portions of anode 14. Generally, the anode active material includes zinc in the form, for example, of particles contained in a slurry.

In some embodiments, the zinc particles contained in different portions of anode 14 have different average sizes. For example, the zinc particle contained in the anode portion 28 can have an average size ranging between 100 microns and 500 microns. The zinc particles contained in the anode portion 30 can have an average size ranging between 20 microns and 100 microns.

In some embodiments, the amount of zinc contained in different portions of anode 14 is controlled. For example, the zinc slurry contained in the anode portion 28 can include about 75 wt % of zinc; whereas the zinc slurry contained in the anode portion 30 can contain about 65 wt % of zinc. Generally, the amount of zinc in various portions of anode 14 can range from about 50 wt % to about 90 wt %, with the balance consisting primarily of electrolyte containing water. If the amount of zinc in different anode portions falls below the stated range, the electronic conductivity and battery capacity can decrease; if the amount is above the stated range, the cell can be starved of water, which is one of the cell reactants.

In some embodiments, other metal particles besides zinc can be included in different portions of anode 14 in the form, for example, of powders, flakes, or fibers. The zinc slurry contained in the anode portion 28 can contain, for example, exclusively zinc particles; whereas the zinc slurry contained in the anode portion 30 can contain tin flakes at a percentage, e.g., of 1 wt % to 10 wt %. The addition of tin flakes to an alkaline anode formulation is disclosed in U.S. Pat. No. 6,251,539.

The length of current collector 20 can also contribute to different discharge behaviors of battery 10. In some embodiments, current collector 20 extends, for example, at least ⅔ or at least ¾, of the total length of battery 10 from negative terminal 24 towards pip 26 (FIG. 1). A long current collector 20 facilitates efficient current collection from the inner portion 28 of anode 14 during the initial discharge period and high discharge spatial uniformity throughout the entire anode when discharge is completed.

Other components of battery 10 can include materials that a conventional alkaline cell typically contains. For example, in addition to the cathode active materials, cathode 12 can also include carbon particles, a binder, and other additives. Examples of cathode active materials include manganese dioxide and nickel oxyhydroxide. The carbon particles may be graphite particles. Examples of binders include polyethylene, polyacrylic acid, or a fluorocarbon resin. The electrolyte solution dispersed throughout cathode 12 can be, for example, an aqueous solution of alkali hydroxide, such as potassium hydroxide or sodium hydroxide.

In addition to the anode active material, anode 14 can further include a gelling agent and minor amounts of additives, such as gassing inhibitors. In addition, a portion of the electrolyte solution discussed above is dispersed throughout the anode. Examples of a gelling agent can include a polyacrylic acid, a grafted starch material, a salt of a polyacrylic acid, a carboxymethylcellulose, a salt of a carboxymethylcellulose (e.g., sodium carboxymethylcellulose) or combinations thereof. A gassing inhibitor can include an inorganic material, such as bismuth, tin, indium, or their compounds. Alternatively, a gassing inhibitor can include an organic compound, such as a phosphate ester, an ionic surfactant or a nonionic surfactant. Optionally, the anode can also contain conductive metal particles other than zinc such as tin, copper, brass or bronze flake or powder.

Separator 16 can be a conventional alkaline battery separator. In other embodiments, separator 16 can include a layer of cellophane combined with a layer of non-woven material. The separator also can include an additional layer of non-woven material. Housing 18 can be a conventional housing commonly used in primary alkaline batteries, for example, nickel plated cold-rolled steel. Current collector 20 can be made from a suitable metal, such as brass, indium or tin coated brass. Seal 22 can be made, for example, of a nylon.

Figure 2A:
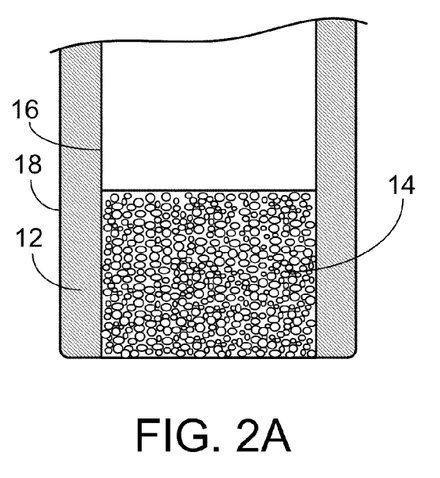
FIGS. 2A-2D are schematic cross-sectional views of a portion of a battery.
Figure 2B:
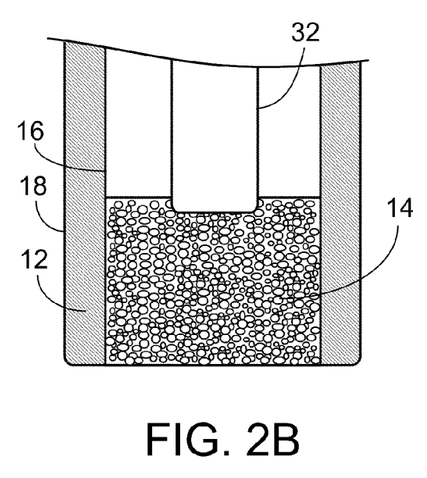
Figure 2C:
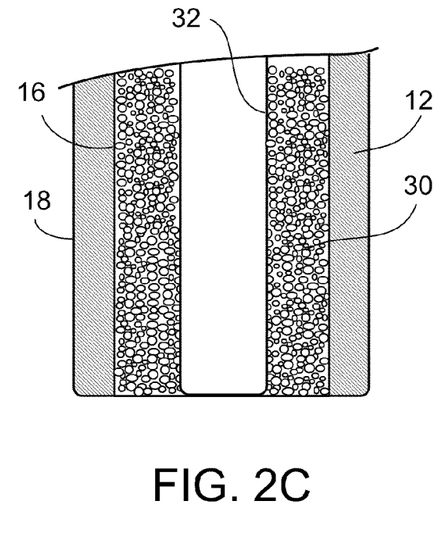
Figure 2D:
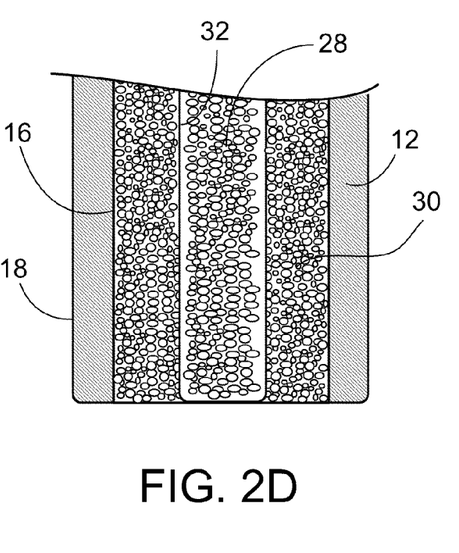

Battery 10 can be manufactured in a conventional way with modifications. For example, referring to FIGS. 2A-2D, when making anode 14, an amount of material required to fill the outer portion 30 is placed into the battery (FIG. 2A). A pre-made tubular shaped (or in other desired shape) separator 32 having one end sealed is inserted into the anode material (FIG. 2B). When the sealed end of separator 32 reaches housing 18, the previously filled anode material is displaced by separator 32 to form the outer portion 30 of anode 14 (FIG. 2C). Finally, anode material for the inner portion 28 of anode 14 is filled into tubular separator 32 (FIG. 2D). Other suitable methods can be used to make battery 10.

Example

In this illustrative example, two non-conventional AA batteries each having a concentric separator separating its anode into two portions are made. Continuous discharge of the two AA batteries are tested and compared with a conventional AA battery. The anode of each battery contains a mixture of 25% small (average about 35 μm in diameter) zinc particles and 75% large (average about 350 μm in diameter) zinc particles.

Each of the two non-conventional AA batteries contains a cylindrical anode separator (FIG. 1A) within the anode and concentric with the separator existing between the anode and the cathode. The anode separator has an inner diameter of about 3/16 inch and is pre-made by winding 2 turns of BH40-R (available from Nippon Kodoshi Co., Kochi, Japan) about a Teflon rod. The wound cylindrical separator is sealed along its longitudinal seam with epoxy adhesive. The bottom of the cylinder is folded closed and also sealed with epoxy adhesive. After the epoxy adhesive has cured, the Teflon rod is removed.

The two non-conventional AA batteries and the conventional AA battery are each continuously discharged on a load of about 3.9 Ohm to a final voltage of about 0.5 V. The voltage of each battery during the discharge is plotted versus the discharging time.

Figure 3:
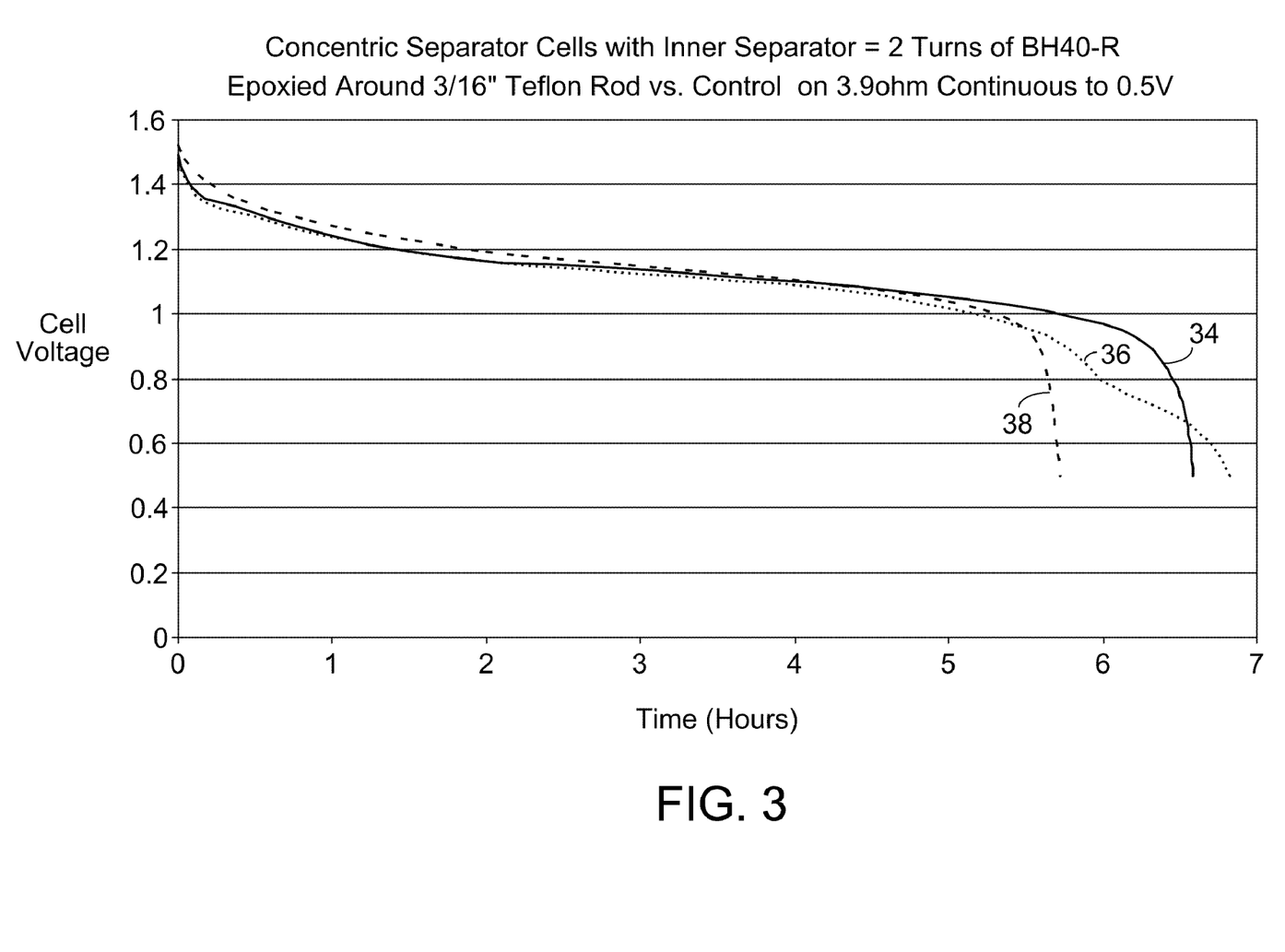
FIG. 3 is a plot of voltage versus discharge time for three AA batteries.

Referring to FIG. 3, curves 34, 36, and 38 correspond to the discharge of the two non-conventional AA batteries and the conventional AA battery, respectively. The voltages of the two non-conventional AA batteries fall below the operating voltage, 0.8 V of the device after about 6.0 hours and about 6.4 hours of service time. The performance difference between the two non-conventional AA batteries can be due to random variations in design and manufacture. The voltage of the conventional AA battery falls below the operating voltage of the device after about 5.6 hours of service time.

Other embodiments are in within the scope of the claims.

What is claimed is:

1. A battery comprising:
a housing having a longitudinal axis and having an end including a negative end cap;
an anode and a cathode within the housing, the anode having a first portion and a second portion adjacent to each other, wherein the first portion of the anode and the second portion of the anode extend along the longitudinal axis of the housing to near the negative end cap;
a current collector extending from the negative end cap along the longitudinal axis of the housing at least partially disposed in the first portion of the anode, the current collector not being disposed in the second potion of the anode;
a separator between the anode and the cathode; and
an anode portion separator at least partially disposed in the anode between the first portion of the anode and second portion of the anode, the current collector thus being in complete electrical communication with the first portion of the anode but not the second portion of the anode.

2. The battery of claim 1, wherein the anode portion separator is cylindrical.

3. The battery of claim 1, wherein the separator between the anode and the cathode and the anode portion separator are concentric.

4. The battery of claim 1, wherein the separator between the cathode and the anode is between only the second portion of the anode and the cathode.

5. The battery of claim 1, wherein the separator between the anode and the cathode and the anode portion separator are formed of separate pieces of material.

6. The battery of claim 1, wherein the separator between the anode and the cathode and the anode portion separator are formed of an integral piece.

7. The battery of claim 1, wherein the current collector is electrically disconnected from the second portion of the anode prior to initial discharge of the battery.

8. The battery of claim 1, wherein the separator between the anode and the cathode and the anode portion separator are electrically insulating and are permeable to materials selected from the group consisting of dissolved substances, liquids, solvents, and ions.

9. The battery of claim 1, wherein the separator between the anode and the cathode and the anode portion separator are cylindrical and the anode portion separator has a diameter of about 10% to about 85% of a diameter of the separator between the anode and the cathode.

10. The battery of claim 1, wherein the battery is a AA battery and the anode portion separator is cylindrical and has a diameter of about 3/16 inch to about 7/32 inch.

11. The battery of claim 1, wherein the anode portion separator has a thickness of about 40 µm to about 400 µm.

12. The battery of claim 1, wherein the anode comprises zinc particles and the zinc particles in the first portion have an average size substantially larger or smaller than an average size of the zinc particles in the second portion.

13. The battery of claim 1, wherein the second portion of the anode comprises zinc particles having an average size of about 20 µm to about 100 µm.

14. The battery of claim 1, wherein the first portion of the anode comprises zinc particles having an average size of about 100 µm to about 500 µm.

15. The battery of claim 1, wherein the current collector is about 2/3 to about 3/4 of a total length of the battery.

16. The battery of claim 1, wherein the first and second portions of the anode each comprises about 50 wt % to about 90 wt % of zinc.

17. The battery of claim 1, wherein when the battery is first used the first portion of the anode, but not the second portion of the anode, starts discharging.

18. A battery comprising:
a housing;
an anode and a cathode within the housing, the anode having a first portion and a second portion adjacent to each other;
a current collector at least partially disposed in the anode;
a separator between the anode and the cathode; and
an anode portion separator at least partially disposed in the anode and between the first and second portions of the anode; and
wherein the anode comprises zinc particles and the zinc particles in the first portion have an average size substantially larger or smaller than an average size of the zinc particles in the second portion.

19. A battery comprising:
a housing;
an anode and a cathode within the housing, the anode having a first portion and a second portion adjacent to each other;
a current collector at least partially disposed in the anode;
a separator between the anode and the cathode; and
an anode portion separator at least partially disposed in the anode and between the first and second portions of the anode;
wherein the current collector is electrically disconnected from the second portion of the anode prior to initial discharge of the battery.

* * * * *

UNITED STATES PATENT AND TRADEMARK OFFICE
CERTIFICATE OF CORRECTION

PATENT NO. : 8,323,835 B2
APPLICATION NO. : 12/243121
DATED : December 4, 2012
INVENTOR(S) : Stuart M. Davis et al.

It is certified that error appears in the above-identified patent and that said Letters Patent is hereby corrected as shown below:

Col. 9, line 21, In Claim 1, delete "potion" and insert --portion--, therefor.

Signed and Sealed this
Twelfth Day of March, 2013

Teresa Stanek Rea
*Acting Director of the United States Patent and Trademark Office*